US010996156B2

(12) United States Patent
Eriten et al.

(10) Patent No.: US 10,996,156 B2
(45) Date of Patent: May 4, 2021

(54) HIGH-THROUGHPUT RHEOMETER

(71) Applicant: Wisconsin Alumni Research Foundation, Madison, WI (US)

(72) Inventors: Melih Eriten, Madison, WI (US); Utku Boz, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 249 days.

(21) Appl. No.: 16/107,393

(22) Filed: Aug. 21, 2018

(65) Prior Publication Data

US 2020/0064246 A1    Feb. 27, 2020

(51) Int. Cl.
*G01N 11/16* (2006.01)

(52) U.S. Cl.
CPC ..................... *G01N 11/16* (2013.01)

(58) Field of Classification Search
CPC ....................................................... G01N 11/16
See application file for complete search history.

(56) References Cited

U.S. PATENT DOCUMENTS

2013/0174666 A1*  7/2013  Hadj Henni .............. G01L 1/24
                                                                    73/800

OTHER PUBLICATIONS

Saurabh Dargar, Ali C. Akyildiz, and Suvranu De, "In Situ Mechanical Characterization of Multilayer Soft Tissue Using Ultrasound Imaging", journal; Nov. 2017, 12 pages, vol. 64 No. 11, IEEE Transactions On Biomedical Engineering.

* cited by examiner

*Primary Examiner* — Walter L Lindsay, Jr.
*Assistant Examiner* — Andrew V Do
(74) *Attorney, Agent, or Firm* — Boyle Fredrickson S.C.

(57) ABSTRACT

A high throughput rheology machine measures transient response to a material subject to the decaying oscillation to determine nonlinear characteristics of the material with a single test cycle.

13 Claims, 4 Drawing Sheets

HIGH-THROUGHPUT RHEOMETER

STATEMENT REGARDING FEDERALLY SPONSORED RESEARCH OR DEVELOPMENT

This invention was made with government support under 1554146 awarded by the National Science Foundation. The government has certain rights in the invention.

CROSS REFERENCE TO RELATED APPLICATION

N/A

BACKGROUND OF THE INVENTION

The present invention relates generally to rheometers for characterizing the dynamic properties of soft materials under stress and in particular to a rheometer providing reduced test time, increasing throughput and decreasing material degradation.

Rheometers are material testing devices, originally used for testing liquid viscosity but more generally applicable to testing any deformable material with respect to the dynamic relationships between stress and strain.

A typical, rotational or sheer type rheometer may provide two opposed plates between which the material to be tested is placed. One plate may be stationary and the other plate may be rotated to impart a rotational shear to the material. The movable plate is instrumented to measure the motion and the force of resistance to movement of the movable plate by the material.

In large amplitude oscillatory shear (LAOS) measurements, the movable plate is oscillated through a predetermined range of large amplitude (many degrees) movements at different frequencies. At each set of amplitudes and frequencies a hysteretic shear stress-strain curve is acquired to provide detailed characterization of the material's dynamic qualities.

LAOS has been successfully applied to a broad range of materials including non-Newtonian fluids, food materials, and the like, but has the drawback of requiring extended measurement times required as the rheometer cycles through many different amplitudes and frequencies. These long measurement times limit throughput and in some cases can accelerate the degradation of the sample, for example, by heating, dehydration, or mechanical breakdown.

SUMMARY OF THE INVENTION

The present invention provides an improved rheology machine that may gather broadband dynamic material property data by measuring transient response of the material when attached to a weight and excited into a decaying oscillation. This data may be processed, for example, using the Hilbert transform to isolate from a single oscillation decay, slowly-varying frequency components obtained by LAOS only by prolonged rheometer cycling. This simplified protocol required in the present invention increases measurement throughput and can be useful for materials that may degrade under the prolonged LAOS protocol.

Specifically, in one embodiment, the present invention provides a rheometer having a fixture for supporting a material to be tested to extend along a first axis away from a contact between the material and fixture. A mass is attachable to the material at a position removed along the first axis from the contact between the material and the fixture and an actuator used for inducing an initial velocity to the mass at an actuation time and allowing the mass and material to oscillate in decaying free vibration after the actuation time. A position sensor monitors the position of the mass after the actuation time in a dimension of oscillation to provide a set of electronic signals indicating position as a function of time. These electronic signals are then analyzed to provide a measure of stress versus strain for the material being tested.

It is thus a feature of at least one embodiment of the invention to substantially shorten the necessary measurement time by extracting data related to multiple frequencies and amplitudes from a single decaying free oscillation.

The computer may further operate to fit the measured stress versus strain to one of a library of predetermined curves for material identification.

It is thus a feature of at least one embodiment of the invention to permit the data it collected by the rheometer to be used to identify the material of predefined material types.

The computer may further operate to provide a measure of damping of the material being tested.

It is thus a feature of at least one embodiment of the invention to provide independent measurement of damping useful for characterizing some materials.

The e position sensor may further monitor the position of the mass after the actuation time along the first axis to provide a second set of electronic signals indicating position as a function of time and wherein the computer further processes the second set of electronic signals to provide an evaluation of bulk modulus D.

It is thus a feature of at least one embodiment of the invention to provide a measurable modulus.

The e stored program may transform the electronic signal using a Hilbert transform.

It is thus a feature of at least one embodiment of the invention to provide a program suitable for extracting frequency-dependent information from a decaying free oscillation.

The e dimension of oscillation may be an axis crossing the first axis, and wherein the fixture supports the material to be measured with the first axis extending horizontally with respect to gravity, or alternatively, the dimension of oscillation may be an axis encircling the first axis and wherein the fixture supports the material to be measured with the first axis extending vertically with respect to gravity.

It is thus a feature of at least one embodiment of the invention to provide a system that may measure either linear or rotational shear.

The mass is adapted to provide at least two and typically four cycles of measurable damped oscillation of the material being tested.

It is thus a feature of at least one embodiment of the invention to permit tailoring of the apparatus for two different materials to the selection of different masses.

The computer may execute the stored program to provide a measure as a composite of multiple actuation cycles.

It is thus a feature of at least one embodiment of the invention to allow versatile tailoring of measurement accuracy through repetition of a cycle of free damped vibration.

These particular objects and advantages may apply to only some embodiments falling within the claims and thus do not define the scope of the invention.

DETAILED DESCRIPTION OF THE PREFERRED EMBODIMENT

Figure 1:
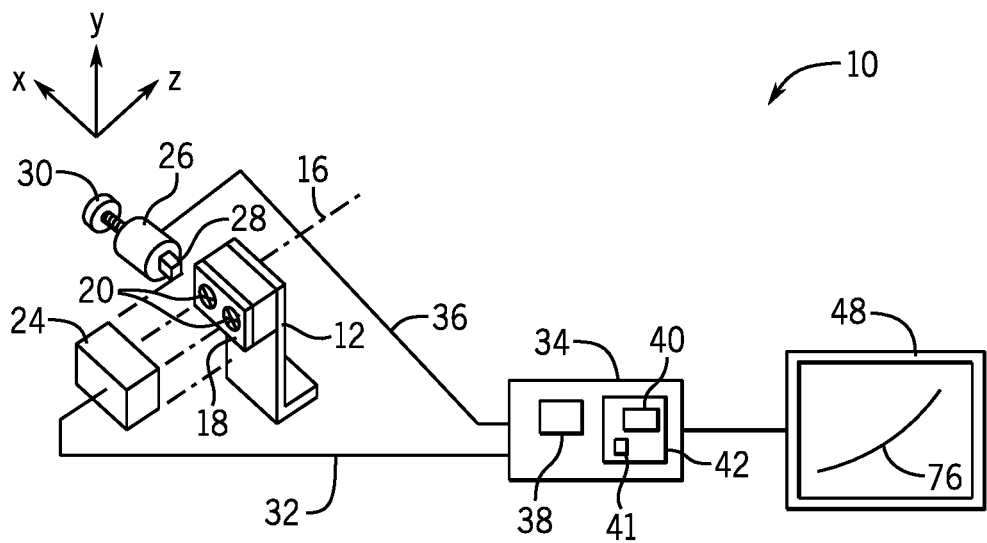
FIG. 1 is a simplified block diagram according to the present invention showing a fixture for supporting a material and a mass attached to that material for nonrotating reciprocation and a sensor measuring that motion and providing signals to a computer for determination of material dynamic properties.

Referring now to FIG. 1, a rheometer 10 according to the present invention may provide for a fixture 12 for supporting a material 14 for testing with the material 14 extending along a first axis 16 generally horizontal with respect to the force of gravity and designated as the z-axis. As so supported, the material 14 extends horizontally in cantilever away from a vertically extending fixture surface supporting a proximal face of the material 14.

Nonlimiting examples of a material 14 include food materials such as gelatin, cheese, and the like, and biological tissues such as skin, fibrin clots, organs such as the liver, and living fibroblasts.

The distal end of the material 14 may be attached to an inertial weight 18, for example, being a plate of metal or the like. In this embodiment, the material 14 is preferably a rectangular parallelepiped with opposed faces attached to the fixture 12 and the inertial weight 18.

An outer vertical wall of the inertial weight 18 may include optical targets 20 for position measurement of the weight 18 by an optical, noncontact position sensor 23. The noncontact position sensor 24 may be, for example, a laser position sensor, a camera, an eddy current sensor, a capacitive sensor, or any of variety of noncontact sensors known in the art. The invention further contemplates that the position sensor may measure position or displacement indirectly, for example, using a laser sensor to measure velocity which can be integrated for displacement measurements. Similarly an accelerometer can be used as the position sensor by two successive integrations of acceleration to yield position.

In all embodiments, the noncontact sensor 24 measures displacement of the metal weight 18 along a horizontal x-axis generally perpendicular to the z-axis discussed above, however in some embodiments, the displacement sensor 24 measures displacement both along the x-axis and z-axis.

Positioned at one side of the weight 18 in the depicted embodiment is an electromagnetic actuator 26 having a pole piece 28 that may magnetically attach to an edge of the weight 18 when the weight 18 is displaced (leftward as depicted) from its resting position defined by the elastic influence of the material 14. As will be discussed below, during operation of the rheometer 10, the weight 18 will be moved away from its resting position and held by the pole piece 28 for later release allowing the material 14 to oscillate in free, decaying vibration. The amount of displacement may be adjusted, for example, by means of an adjustment knob 30 having a screw mechanism for moving the pole piece 28 various distances away from the resting position of the weight 18 for different materials and tests.

It will be appreciated from the following discussion that other types of actuators 26 may be used for the purpose of imposing an initial velocity to the material 14 including, for example, other types of release mechanisms including mechanical catches and the like as well as actuators that provide an initial push to the weight 18 from its resting to an initial velocity, for example, as applied mechanically through a hammer mechanism, electromagnetically through a magnetic coil, or by means of air jets or the like acting on the weight 18.

The position sensor 24 may send a set of displacement measurements 32 to a rheometer controller 34, for example, as a stream of digitized numeric values where corresponding, continuous-range analog values are converted to digital values for processing by the controller 34.

The controller 34 may also control output actuation signals 36, for example, controlling the actuator 26 to release the weight 18 at the beginning of an acquisition cycle to be discussed below.

Generally the controller 34 may include electronic processor 38 executing a stored program 40 to be described below as held in non-transient memory 42. The memory 42 may also include a library 41 providing a set of curves of material types (captured as lookup table values or as polynomials) that can be used for the identification of a material being tested as discussed below. The controller 34 may communicate with an output device 48, for example, the display screen for outputting charts or data as will be also discussed below.

Figure 2:
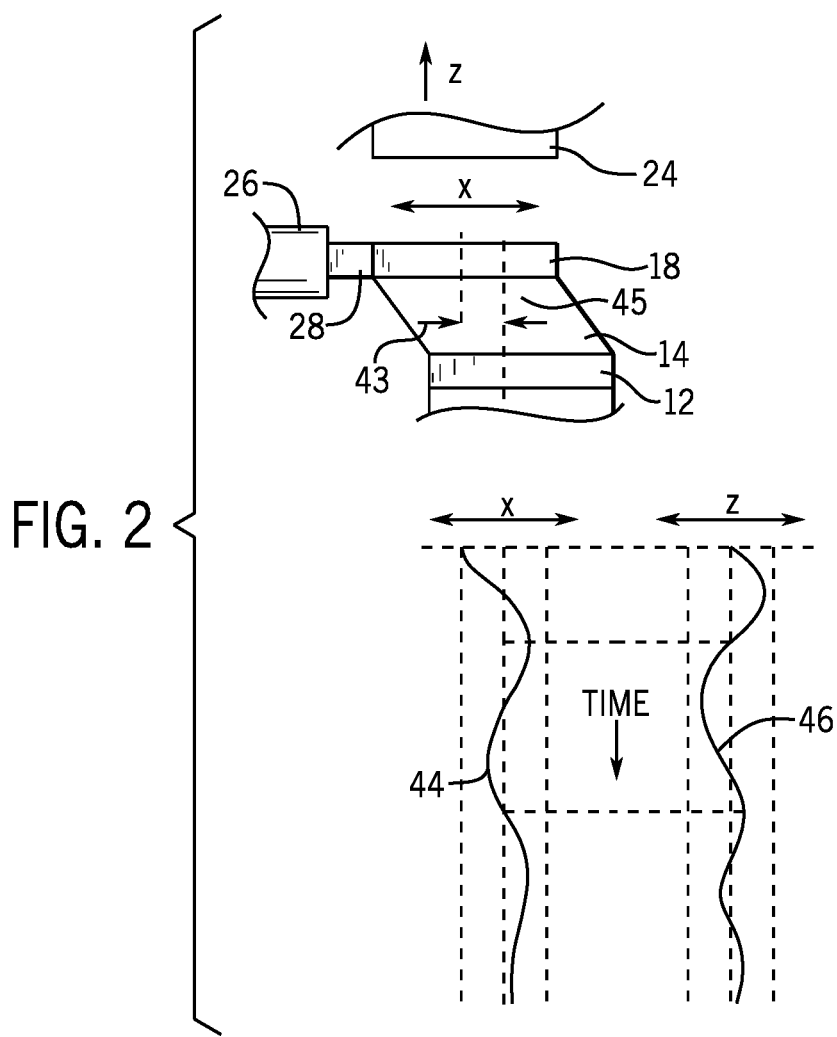
FIG. 2 is a top plan view of the material held by the fixture of FIG. 1 with an initial displacement prior to release for free vibration and showing measured x-axis and z-axis signals acquired by the system of FIG. 1 as a function of time.

Referring now to FIG. 2, generally the rheometer 10 works by making an acquisition describing a history of motion of the weight 18 during free vibration of the material 14. In this regard, the weight 18 may be displaced to contact the pole piece 28 and the actuator 26 is energized to hold the weight 18 in this position by magnetic attraction caused by current flowing through the solenoid winding. At this time, the material 14 has a shear force applied along the x-axis and its center point displaced by a displacement value 43 from a resting position 45 in which the material 14 is fully relaxed without the application of external force.

To start an acquisition cycle, the actuator 26 is deactivated and the position of the weight 18 monitored by the noncontact sensor 24 along the x-axis during a free oscillation decay to produce a series of data points 44 as a function of time indicating relative displacement of the weight 18 along the x-axis. At the same time, a second set of data points 46 indicating z-axis displacement of the weight 18 may be acquired by the noncontact sensor 24. Generally, both of these signals will show a sinusoidal decay about the resting position 45 ideally having at least two full cycles of oscillation before reaching a 63 percent decay value representing its oscillation decay time constant.

Figure 3:
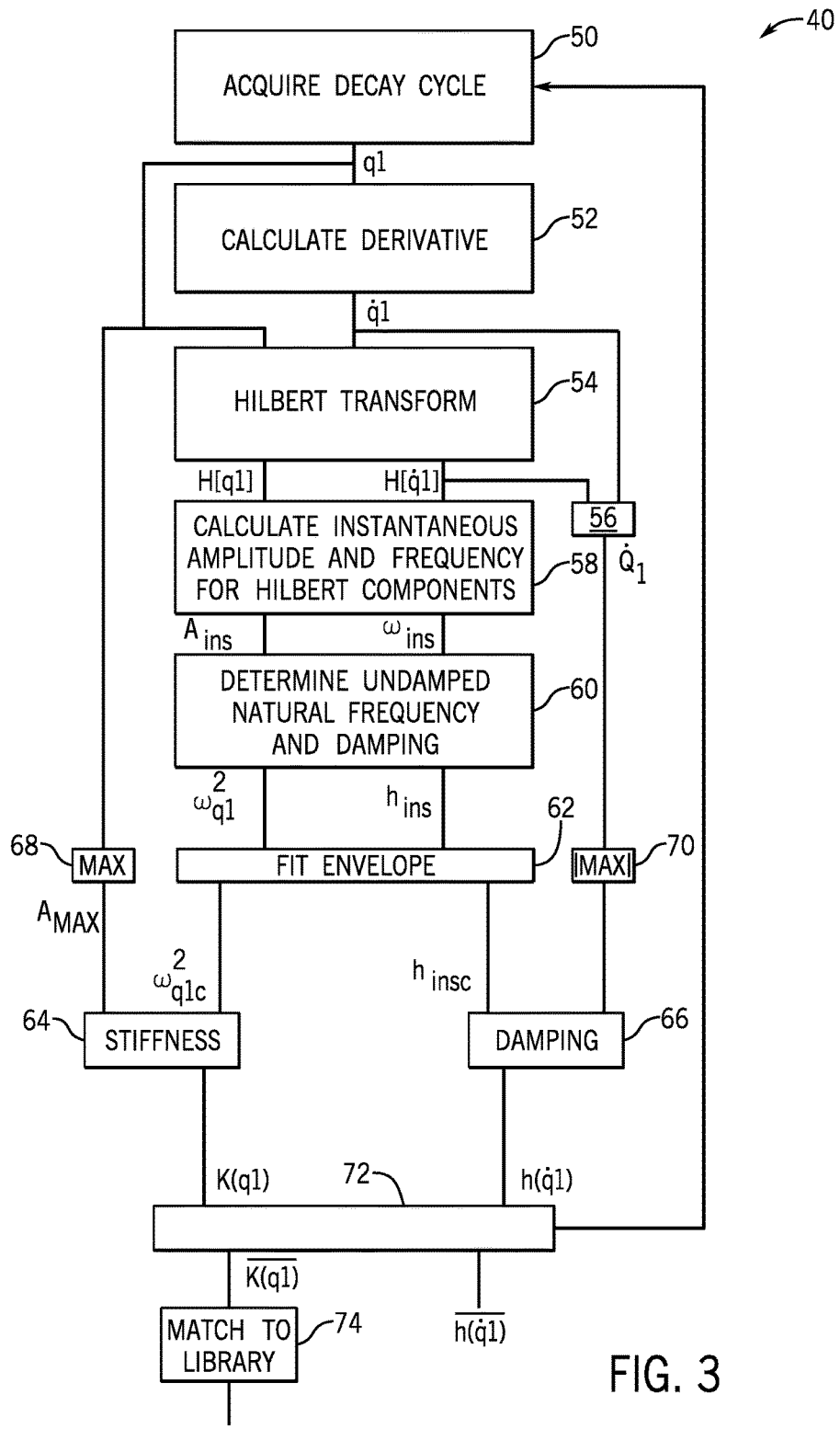
FIG. 3 is a flowchart of a program executed by the computer of FIG. 1 for determining the material dynamic properties using the fixture of FIG. 1.
Figure 6:
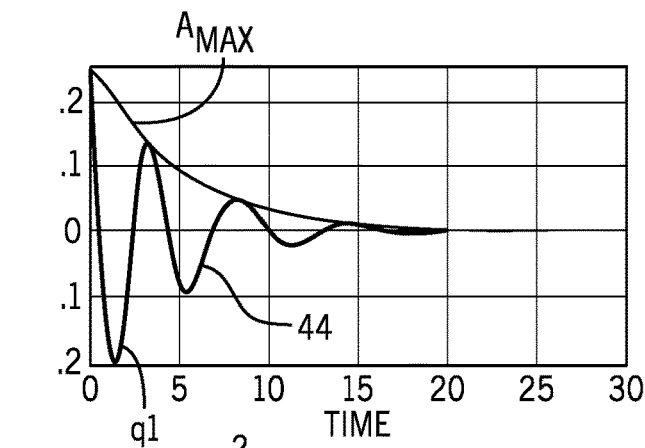
FIG. 6 is a graph of a measured signal obtained using the system of FIG. 1 and an extracted maximum amplitude envelope as a function of time used in the processing of the present invention.

Referring now to FIG. 3, this acquisition cycle is indicated by process block 50 and produces a signal $q_1$ described by points 44 as shown in FIG. 6.

Next, as indicated by process block 52 this signal may be differentiated to provide a derivative signal $\dot{q}_1$.

Per succeeding process block 54, these two signals of $q_1$ and $\dot{q}_1$ are then processed by the Hilbert transform to produce transform functions $H[q_1]$ and $H[\dot{q}_1]$ according to techniques well known in the art.

The transform functions $H[q_1]$ and $H[\dot{q}_1]$ may generally be used to create two new analytical signals $Q_1$ and $\dot{Q}_1$ according to the following equations:

$$Q_1 = q_1 + *\overset{\text{i}}{\text{i}} H[q_1] \tag{1}$$

and $$\dot{Q}_1 = \dot{q}_1 + *\overset{\text{i}}{\text{i}} H[\dot{q}_1] \tag{2}$$

where the "i" symbol is the square root of −1 and H indicates the Hilbert transform. The processing of equation (2) is represented by process block 56.

The transfer functions $H[q_1]$ and $H[\dot{q}_1]$ may further be used as indicated by process block 58 to calculate instantaneous amplitude $A_{ins}$ and instantaneous frequency $\omega_{ins}$ as a function of time as follows:

$$A_{ins} = \sqrt{q_1^2 + H[q_1]^2} \tag{3}$$

and $$\omega_{ins} = \frac{q_1 H[\dot{q}_1] - \dot{q}_1 H[q_1]}{A_{ins}^2} = \text{Im}\left(\frac{\dot{Q}_1}{Q_1}\right) \tag{4}$$

Figure 7:
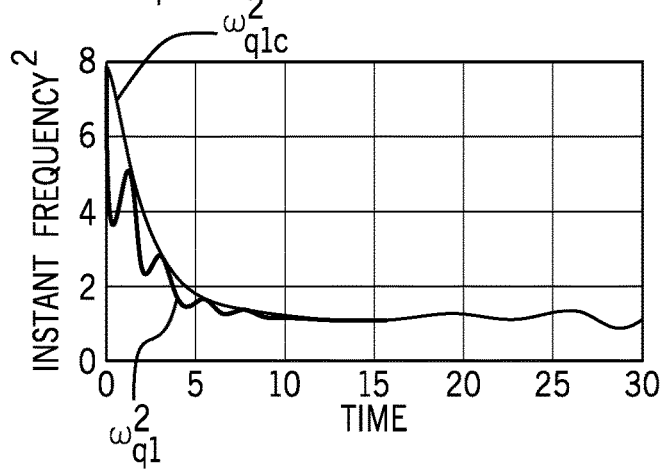
FIG. 7 is a figure similar to FIG. 6 showing instantaneous frequency and the frequency envelope extracted using the Hilbert transform.

At process block 60 the values of instantaneous amplitude $A_{ins}$ and instantaneous frequency $\omega_{ins}$ as determined above are used to produce an undamped natural frequency $\omega_{q_1}^2$ (shown in FIG. 7) and damping coefficient $h_{\dot{q}_1}$ as follows:

$$\omega_{q_1}^2 = \omega_{ins}^2 - \frac{\ddot{A}_{ins}}{A_{ins}} + \frac{2\dot{A}_{ins}^2}{A_{ins}^2} + \frac{\dot{A}_{ins}\dot{\omega}_{ins}}{A_{ins}\omega_{ins}} \tag{5}$$

and $$h_{ins} = -\frac{\dot{A}_{ins}}{A_{ins}} - \frac{\dot{\omega}_{ins}}{2\omega_{ins}} \tag{6}$$

The value of $\omega_{q_1}^2$, shown in equation (5) is shown normalized with respect to mass and in use would be multiplied by the mass value of the weight 18. At process block 62 a congruent envelope is fit to each of these values to provide the values $\omega_{q_{1c}}^2$ (shown in FIG. 7) and $h_{\dot{q}_{1c}}$ and these values are used to compute a frequency-dependent stiffness $k(q_1)$ and a frequency-dependent damping as follows per process blocks 64 and 66 respectively of:

$$k(A_{max}) = \omega_{q_{1c}}^2 A_{max} \tag{7}$$

and $$h(|\dot{Q}_1|) = h_{\dot{q}_{1c}} |\dot{Q}_1|_{max} \tag{8}$$

The values of $A_{max}$ and $|\dot{Q}_1|_{max}$ for equations (7) and (8) are obtained at process blocks 68 and 70 respectively using well-known maximum and absolute value determination techniques.

The value $k(q_1)$ given by equation (7) and the value $h(\dot{q}_1)$ given by equation (8) represent the stiffness and damping of the material 14 as a function of time and can be readily converted to functions of displacement or strain based on the known history of movement of the material being tested reflected by values $q_1$.

As indicated by process block 72, the steps of process blocks 50-70 may be repeated and these values averaged to provide more robust output.

Figure 8:
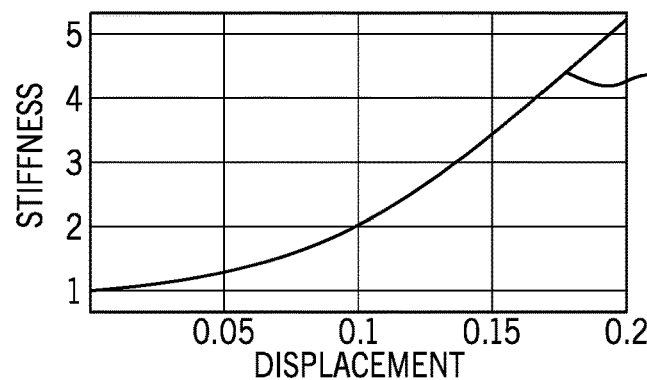
FIG. 8 is a measurement of stiffness versus displacement as may be determined using the present invention.
Figure 9:
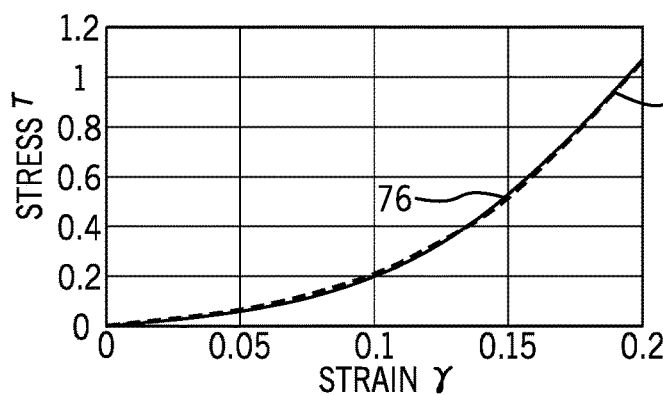
FIG. 9 is a plot of stress versus strain as fit to a curve in a library held by the computer of FIG. 1.

Referring now to FIGS. 1 and 8, the rheometer 10 may output on output device 48 a plot showing stiffness of the material being tested as a function of displacement, clearly indicating the nonlinearity in stiffness. As shown in FIG. 9 this same information may be conveyed as a plot of stress versus strain (the latter being equivalent to the displacement of FIG. 8). At process block 74 of FIG. 3, the stress/strain curve 76 of FIG. 9, may be fit to one or more polynomial generated curves 78 held in the curve library 41 of memory 42. This fitting process may allow the user to identify material type, for example, as an elastic material, a biphasic material, etc. and may fit the curve 78 of that material type by adjusting coefficients of a polynomial model by adjusting those coefficients thereby providing insight into the material properties. Alternatively a set of predefined materials having fixed curves may be matched to identify a material archetype.

Figure 4:
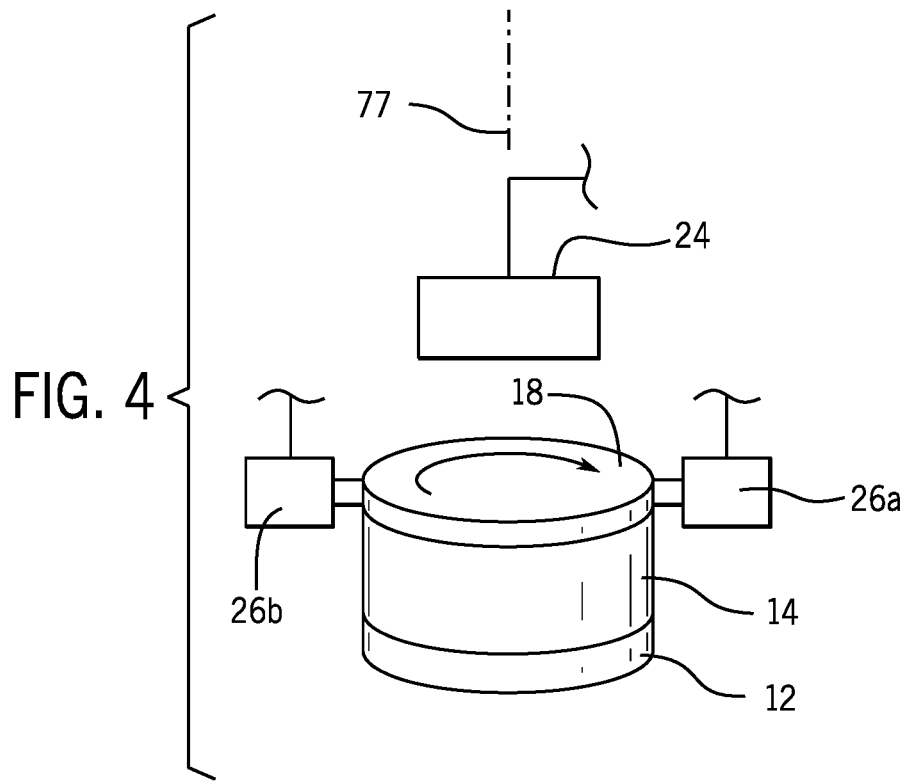
FIG. 4 is a perspective view of an alternative fixture to the fixture of FIG. 1 for measuring rotational strain such as may be used with the program of FIG. 3.

Referring now to FIG. 4, the same program 40 discussed above may be used to determine stiffness and damping by imparting a rotational shear rather than linear shear to the material 14. In this case, the fixture 12 may provide for a generally horizontal support for the material 14, and the weight 18 may be applied to the upper surface of the material 14. This weight 18 may be rotationally symmetric about a vertical or y-axis 77, for example, in the form of a disk. In this case, twin diametrically opposed actuators 26 may hold the weight 18 in an initial twisted configuration applying a torque about axis 77 after which it is released to allow rotational oscillation of the weight 18 measured again by the sensor 24 operating a rotational framework.

Figure 5:
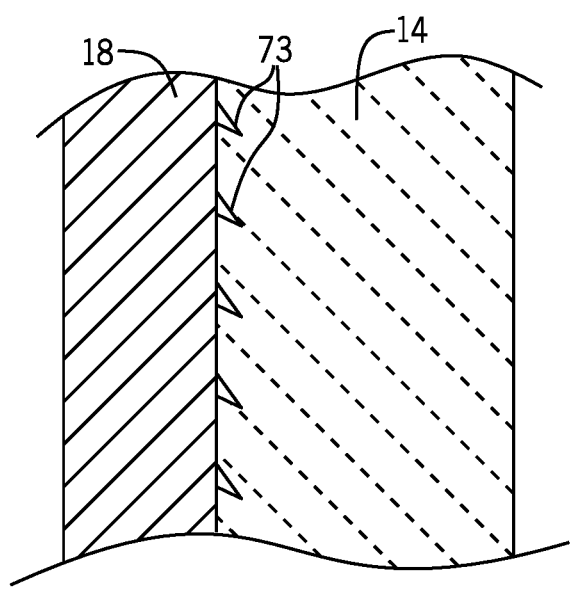
FIG. 5 a cross-sectional view through the weight and material being tested of FIGS. 1 and 4 showing a system for attaching the weight to a variety of soft materials.

Referring now to FIG. 5, the weight 18 may be attached to the material 14, for example, by using adhesives or mechanical coupling, for example, in the form of multiple teeth 73 extending from the weight 18 to engage the material 14. The teeth 73 may be tipped to promote engagement against the force of gravity or rotational inertia.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A rheometer comprising:
   a fixture for supporting a material to be tested to extend along a first axis away, from a contact between the material and fixture;
   a mass attachable to the material at a position removed along the first axis from the contact between the material and the fixture;
   an actuator for inducing an initial velocity to the mass at an actuation time and disconnecting from the mass to allow the mass and material to oscillate in decaying free vibration after the actuation time;
   a position sensor monitoring the position of the mass after the actuation time in a dimension of oscillation to provide a set of electronic signals indicating position as a function of time; and
   a computer executing a stored program to receive the set of electronic signals during an actuation cycle beginning at actuation time during the decaying free vibration and execute a stored program stored in non-transitory medium to analyze the electronic signals during the actuation cycle to provide a measure of stress versus strain for the material being tested.

2. The rheometer of claim 1 wherein the computer further operates to fit the measured stress versus strain to one of a library of predetermined curves for material identification.

3. The rheometer of claim 1 wherein the computer further operates to provides a measure of damping of the material being tested.

4. The rheometer of claim 1 wherein the position sensor further monitors the position of the mass after the actuation time along the first axis to provide a second set of electronic signals indicating position as a function of time and wherein the computer further processes the second set of electronic signals to provide an evaluation of bulk modulus D.

5. The rheometer of claim 1 wherein the stored program transforms the electronic signal using a Hilbert transform.

6. The rheometer of claim 1 wherein the dimension of oscillation is an axis crossing the first axis and wherein the fixture supports the material to be measured with the first axis extending horizontally with respect to gravity.

7. The rheometer of claim 1 wherein the dimension of oscillation is an axis encircling the first axis and wherein the fixture supports the material to be measured with the first axis extending vertically with respect to gravity.

8. The rheometer of claim 1 wherein the mass is adapted to provide at least four cycles of measurable damped oscillation of the material being tested.

9. The rheometer of claim 1 wherein the computer executes the stored program to provide a measure as a composite of multiple actuation cycles.

10. The rheometer of claim 1 wherein the position sensors are noncontact position sensor.

11. The rheometer of claim 1 wherein the mass is a plate having a surface adapted to contact the material including material piercing teeth.

12. The rheometer of claim 1 wherein the mass includes fiducial markings for optical recognition by a noncontact optical displacement sensor providing the position sensor.

13. A method of measuring material properties using:
   a fixture for supporting a material to be tested to extend along a first axis away from a contact between the material and fixture;
   a mass attachable to the material at a position removed along the first axis from the contact between the material and the fixture;
   an actuator for inducing an initial velocity to the mass at an actuation time and allowing the mass and material to oscillate in decaying free vibration after the actuation time;
   a position sensor monitoring the position of the mass after the actuation time in a dimension of oscillation to provide a set of electronic signals indicating position as a function of time; and
   a computer executing a stored program to receive the set of electronic signals during an actuation cycle beginning at an actuation time during the decaying free vibration and execute a stored program stored in non-transitory medium to analyze the electronic signals during the actuation cycle to provide a measure of stress versus strain for the material being tested; the method comprising:
   (a) attaching the mass to a distal end of the material to be measured as supported at a proximal end by the fixture;
   (b) stimulating the material to be measured into free oscillation; and
   (c) processing the electronic signals using the computer to determine a measure of stress versus strain for the material being tested; and
   further including the step of selecting the mass and stimulation amplitude to provide at least two cycles of measurable free oscillation.

* * * * *